(12) United States Patent
Seale

(10) Patent No.: US 11,813,973 B2
(45) Date of Patent: Nov. 14, 2023

(54) TRAILER-MOUNTED THREE-WAY ADJUSTABLE WHEEL LOCKING DEVICE

(71) Applicant: Southern Seale, Round Rock, TX (US)

(72) Inventor: Southern Seale, Round Rock, TX (US)

(*) Notice: Subject to any disclaimer, the term of this patent is extended or adjusted under 35 U.S.C. 154(b) by 237 days.

(21) Appl. No.: 17/166,373

(22) Filed: Feb. 3, 2021

(65) Prior Publication Data

US 2022/0242299 A1     Aug. 4, 2022

(51) Int. Cl.
*B60P 3/077*     (2006.01)
*B60T 3/00*     (2006.01)

(52) U.S. Cl.
CPC ............... *B60P 3/077* (2013.01); *B60T 3/00* (2013.01)

(58) Field of Classification Search
CPC .... B60T 3/00; B60P 3/077; B64F 1/16; Y10T 70/5841; Y10T 70/585
See application file for complete search history.

(56) References Cited

U.S. PATENT DOCUMENTS

| | | | | |
|---|---|---|---|---|
| 3,695,071 A | * | 10/1972 | West | B60R 25/093 70/225 |
| 4,013,145 A | * | 3/1977 | Mumm | B60T 3/00 188/DIG. 2 |
| 6,290,029 B1 | * | 9/2001 | Gubler | B61H 7/02 188/4 R |
| 7,121,508 B2 | * | 10/2006 | Fulcher | B64F 1/16 70/228 |
| 7,513,725 B1 | * | 4/2009 | Bullock | B60P 3/075 410/11 |
| 8,499,899 B2 | * | 8/2013 | Scott | B60T 3/00 188/4 R |
| 2004/0188187 A1 | * | 9/2004 | Curl | B60T 3/00 188/32 |

FOREIGN PATENT DOCUMENTS

KR          200418011 Y1 *  6/2006

* cited by examiner

*Primary Examiner* — Melanie Torres Williams
(74) *Attorney, Agent, or Firm* — Pharar Patents & Intellectual Property; Andrew A. Pharar

(57) ABSTRACT

The trailer-mounted three-way adjustable wheel locking device disclosed herein may be reversibly mounted on a trailer deck, and may allow for the quick securing of a lawn mower, all-terrain vehicle, or other similar vehicle to the deck. The device may comprise two chocks into which one wheel of the vehicle may be driven or pushed, and a locking arm that secures the wheel of the vehicle between the two chocks. The locking arm itself may be reversibly locked for safety and security. The trailer-mounted three-way adjustable wheel locking device may further comprise a height, width, and length adjustment mechanism that allows for tires of different heights, widths, and diameters to be secured.

5 Claims, 8 Drawing Sheets

TRAILER-MOUNTED THREE-WAY ADJUSTABLE WHEEL LOCKING DEVICE

TECHNICAL FIELD OF THE INVENTION

The present invention relates in general to wheel chocks, and, more specifically, to a trailer-mounted three-way adjustable wheel locking device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A trailer is an unpowered wheeled frame that may be towed by another vehicle. Trailers are made available with a variety of accessories and in a large number of shapes, sizes, and designs depending on their intended use, and may vary from a small flat deck on a frame to an entire living space. Such trailers are used, generally, for securing and moving items from one place to another. By way of example, an open, triangular-frame trailer may comprise a number of supports onto which a boat may be placed for transporting, while a closed box trailer may be insulated and refrigerated for moving perishable goods across the country. Flat deck trailers, in particular, may be sized and accessorized to carry bicycles, motorcycles, lawn mowers, all-terrain vehicles, and full size cars and trucks.

A lawn mower is a wheeled machine utilizing one or more rotating blades used for cutting a grass surface. Lawn mowers are made available in a number of sizes and variations, and can be powered by such various means as the pushing of the mower or the driving by an onboard engine. Typical lawn mowers are small enough that an individual user can push or guide the device across a lawn or garden. In the case of larger mowers or where needed for larger areas a lawn mower may be designed as a ride-on mower, further comprising a seat for the user to sit upon. Such lawn mowers generally have four wheels, and the front wheels may be steerable.

An all-terrain vehicle (ATV), which may also be known as a quad bike, is a small vehicle having a straddle seating position, handlebars for steering and control, and four wheels. ATVs are known for having a light footprint and the ability to travel over rough terrain and to otherwise inaccessible areas. Because ATVs are generally not road-legal, such ATVs are often hauled to a use area on a trailer pulled by a car or truck. Once at the area of use, the ATV may be removed from the trailer, and driven onward to a destination.

The mounting and securing of lawn mowers and all-terrain vehicles to trailers for transport can be achieved by a number of different methods. By way of example, a lawn mower or ATV may be positioned on the trailer and then the vehicle or the wheels of the vehicle may be tied to the trailer using tie-down straps. Another way of securing a lawn mower or all-terrain vehicle to a trailer would be through the use of tie-down straps in combination with chocks placed against the wheels of the vehicle. These chocks may be used to aid in preventing unwanted movement of the vehicle on the trailer. The use of tie-down straps, while effective, requires a significant amount of installation time, and the straps must be thoroughly tightened to prevent even the smallest movement of the vehicle. No solution exists that allows a lawn mower, all-terrain vehicle, or other similar vehicle to be mounted on a trailer quickly and securely.

Thus, there is a need in the art for a trailer-mounted three-way adjustable wheel locking device that may be reversibly mounted on a trailer deck, and may allow for the quick securing of a lawn mower, all-terrain vehicle, or other similar vehicle to the deck. The device may comprise two chocks into which one wheel of the vehicle may be driven or pushed, and a locking arm that secures the wheel of the vehicle between the two chocks. The locking arm itself may be reversibly locked for safety and security. The trailer-mounted three-way adjustable wheel locking device may further comprise a height, width, and length adjustment mechanism that allows for tires of different heights, widths, and diameters to be secured. It is to these ends that the present invention has been developed.

BRIEF SUMMARY OF THE INVENTION

To minimize the limitations in the prior art, and to minimize other limitations that will be apparent upon reading and understanding the present specification, the present invention describes a trailer-mounted three-way adjustable wheel locking device.

It is an objective of the present invention to provide a trailer-mounted three-way adjustable wheel locking device that may comprise a main body.

It is another objective of the present invention to provide a trailer-mounted three-way adjustable wheel locking device that may comprise a front chock.

It is another objective of the present invention to provide a trailer-mounted three-way adjustable wheel locking device that may comprise a rear chock.

It is another objective of the present invention to provide a trailer-mounted three-way adjustable wheel locking device that may comprise a front mounting bracket.

It is another objective of the present invention to provide a trailer-mounted three-way adjustable wheel locking device that may comprise a rear mounting bracket.

It is another objective of the present invention to provide a trailer-mounted three-way adjustable wheel locking device that may comprise a wheel locking mechanism.

It is another objective of the present invention to provide a trailer-mounted three-way adjustable wheel locking device that may comprise a wheel retaining bracket.

It is another objective of the present invention to provide a trailer-mounted three-way adjustable wheel locking device that may comprise a rotating arm.

It is another objective of the present invention to provide a trailer-mounted three-way adjustable wheel locking device that may comprise a locking gear.

It is another objective of the present invention to provide a trailer-mounted three-way adjustable wheel locking device that may comprise a release lever.

It is another objective of the present invention to provide a trailer-mounted three-way adjustable wheel locking device that may comprise a width adjustment mechanism.

It is another objective of the present invention to provide a trailer-mounted three-way adjustable wheel locking device that may comprise a width adjustment plate.

It is another objective of the present invention to provide a trailer-mounted three-way adjustable wheel locking device that may comprise a length adjustment mechanism.

It is another objective of the present invention to provide a trailer-mounted three-way adjustable wheel locking device that may comprise a slide block.

It is another objective of the present invention to provide a trailer-mounted three-way adjustable wheel locking device that may comprise a resilient material of construction.

It is another objective of the present invention to provide a trailer-mounted three-way adjustable wheel locking device that may comprise a water-proof material of construction.

It is another objective of the present invention to provide a trailer-mounted three-way adjustable wheel locking device that may comprise a rust-proof material of construction.

It is another objective of the present invention to provide a trailer-mounted three-way adjustable wheel locking device that may comprise a reusable material of construction.

It is another objective of the present invention to provide a trailer-mounted three-way adjustable wheel locking device that may comprise a multi-component construction.

It is another objective of the present invention to provide a trailer-mounted three-way adjustable wheel locking device that may comprise an antimicrobial layer.

It is another objective of the present invention to provide a trailer-mounted three-way adjustable wheel locking device that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The trailer-mounted three-way adjustable wheel locking device disclosed herein may be reversibly mounted on a trailer deck, and may allow for the quick securing of a lawn mower, all-terrain vehicle, or other similar vehicle to the deck. The device may comprise two chocks into which one wheel of the vehicle may be driven or pushed, and a locking arm that secures the wheel of the vehicle between the two chocks. The locking arm itself may be reversibly locked for safety and security. The trailer-mounted three-way adjustable wheel locking device may further comprise a height, width, and length adjustment mechanism that allows for tires of different heights, widths, and diameters to be secured.

Figure 1:
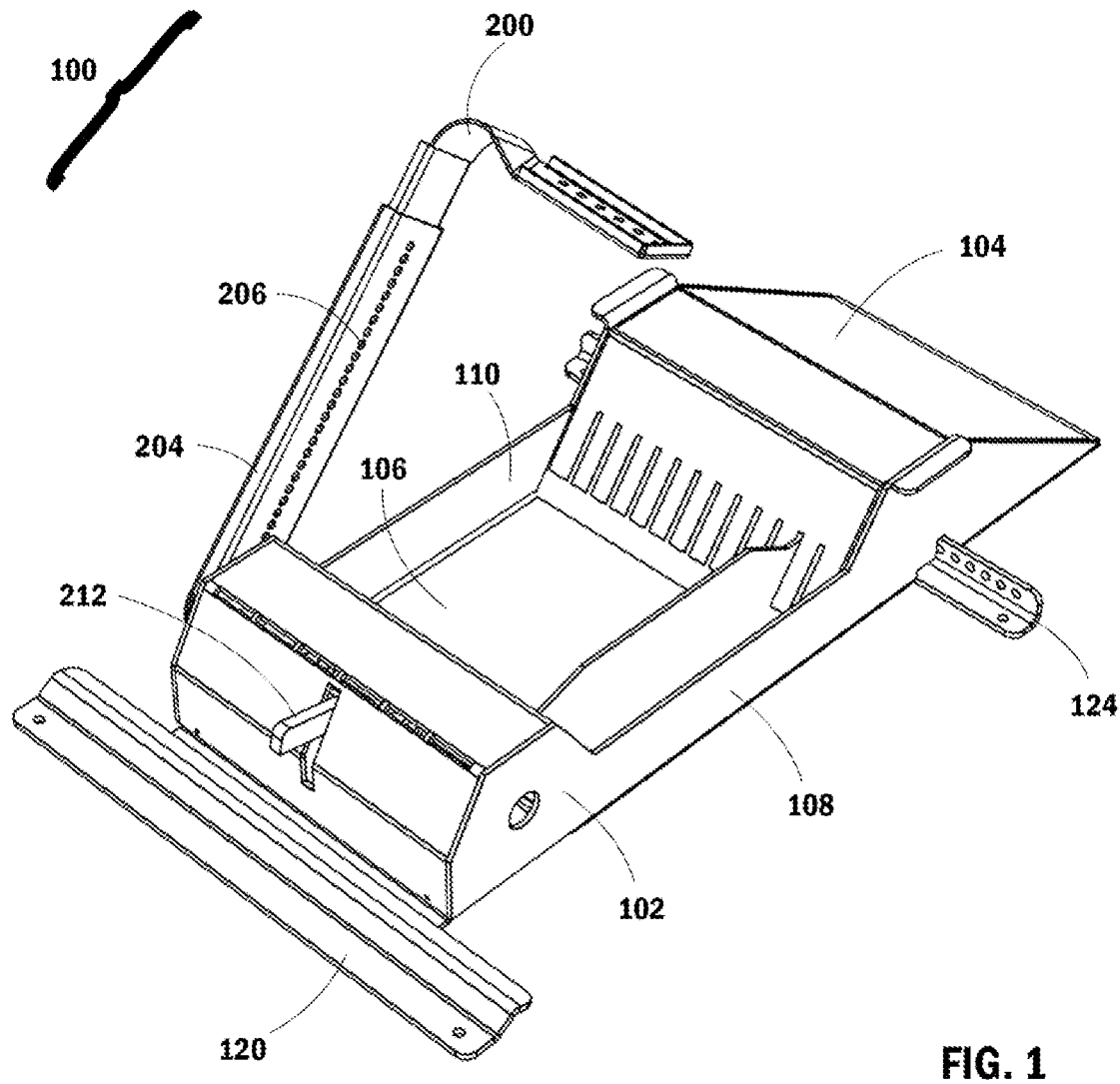
FIG. 1 is an isometric perspective view of a trailer-mounted three-way adjustable wheel locking device, as contemplated by the present disclosure.
Figure 2:
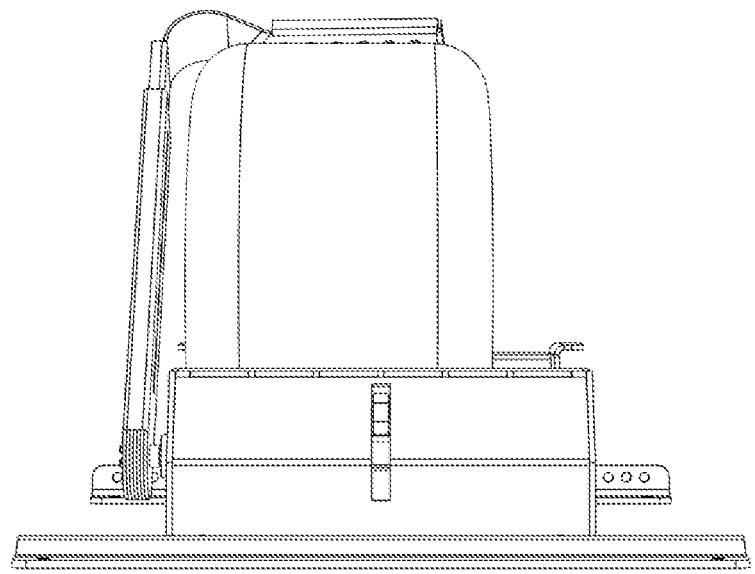
FIG. 2 is a front plan view of a trailer-mounted three-way adjustable wheel locking device with a wheel installed, as contemplated by the present disclosure.
Figure 3:
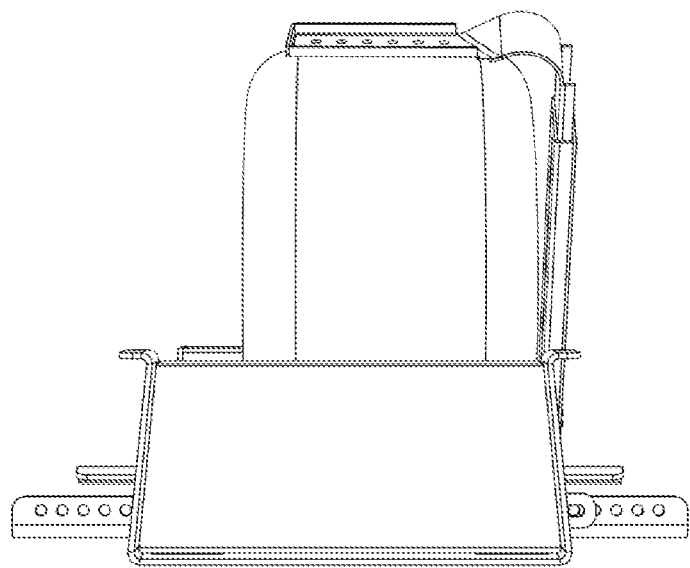
FIG. 3 is a rear plan view of a trailer-mounted three-way adjustable wheel locking device with a wheel installed, as contemplated by the present disclosure.
Figure 4:
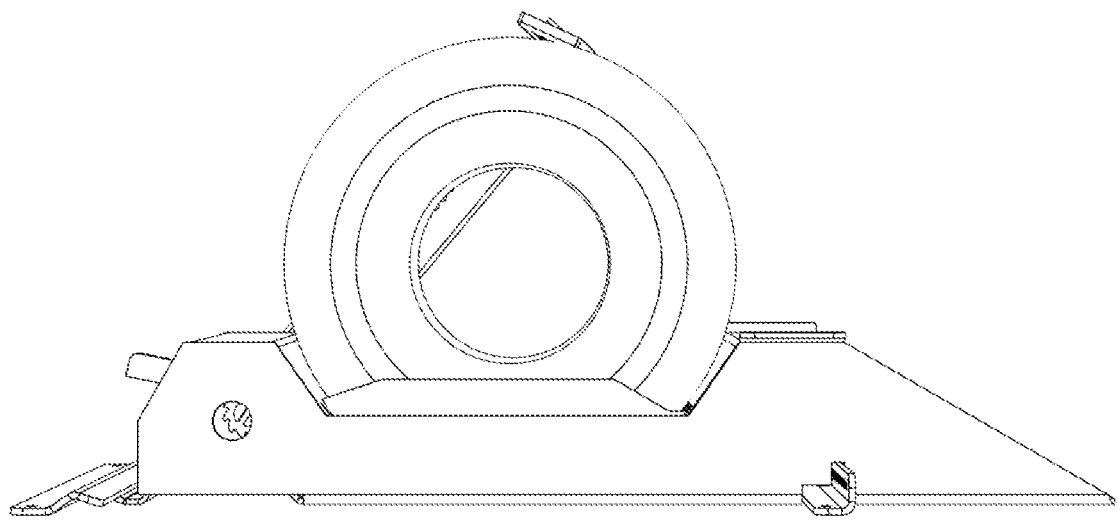
FIG. 4 is a left side elevation view of a trailer-mounted three-way adjustable wheel locking device with a wheel installed, as contemplated by the present disclosure.
Figure 5:
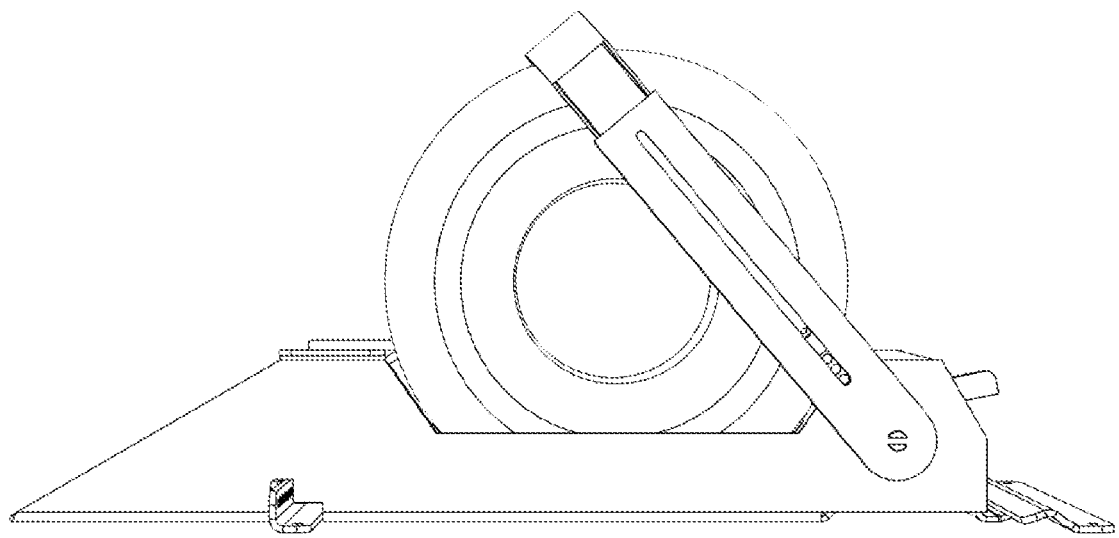
FIG. 5 is a right side elevation view of a trailer-mounted three-way adjustable wheel locking device with a wheel installed, as contemplated by the present disclosure.
Figure 6:
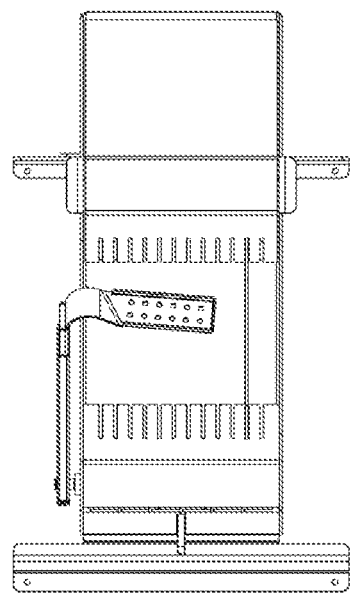
FIG. 6 is a top plan view of a trailer-mounted three-way adjustable wheel locking device with a wheel installed, as contemplated by the present disclosure.
Figure 7:
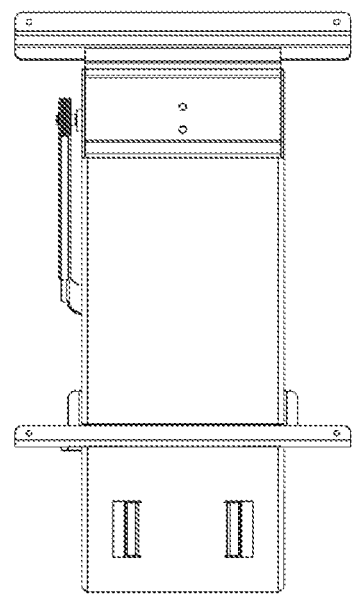
FIG. 7 is a bottom plan view of a trailer-mounted three-way adjustable wheel locking device with a wheel installed, as contemplated by the present disclosure.
Figure 8:
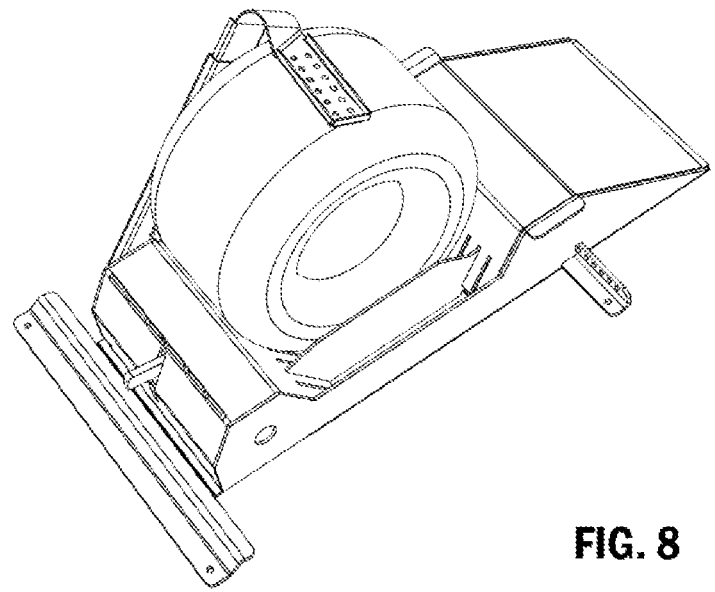
FIG. 8 is an isometric perspective view of a trailer-mounted three-way adjustable wheel locking device with a wheel installed, as contemplated by the present disclosure.
Figure 9:
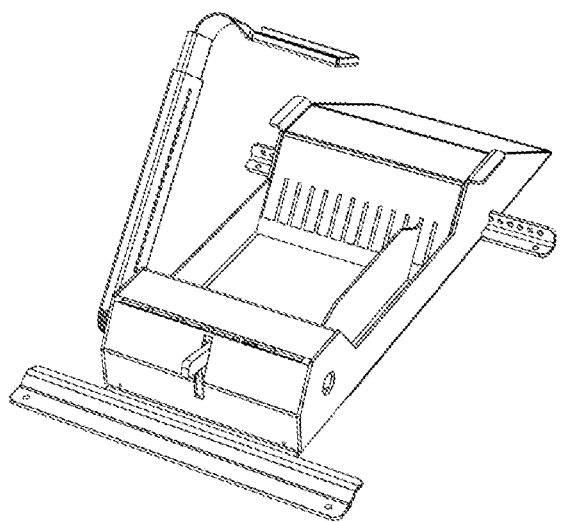
FIG. 9 is an isometric perspective view of a reversible mounting mechanism of a trailer-mounted three-way adjustable wheel locking device with a wheel installed, as contemplated by the present disclosure.
Figure 9:
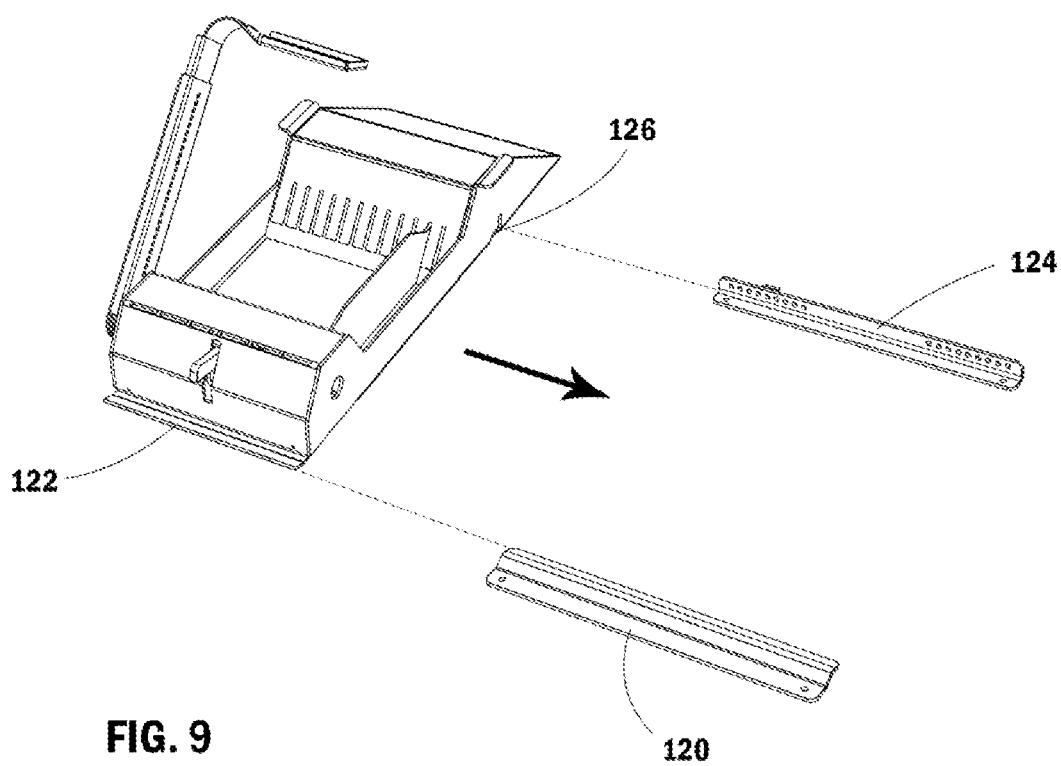
Figure 10:
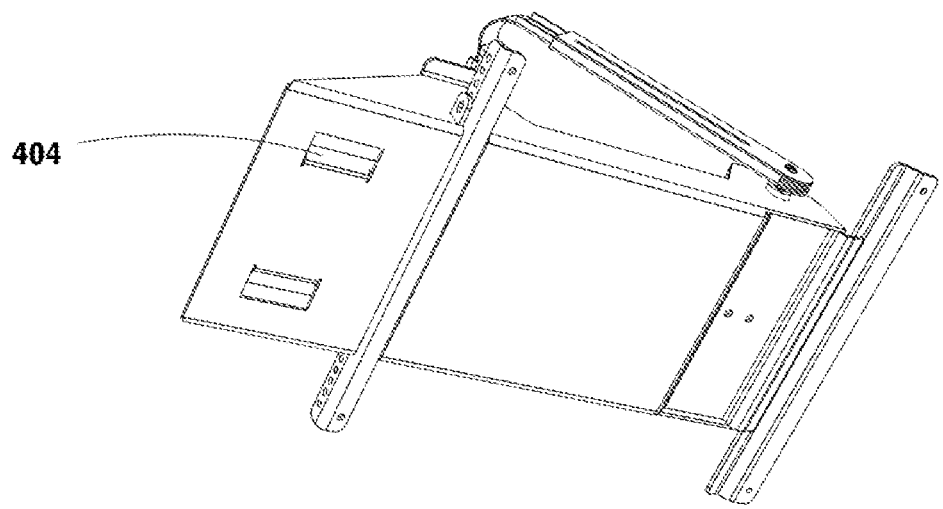
FIG. 10 is a bottom isometric perspective view of slide rails of a trailer-mounted three-way adjustable wheel locking device, as contemplated by the present disclosure.
Figure 11:
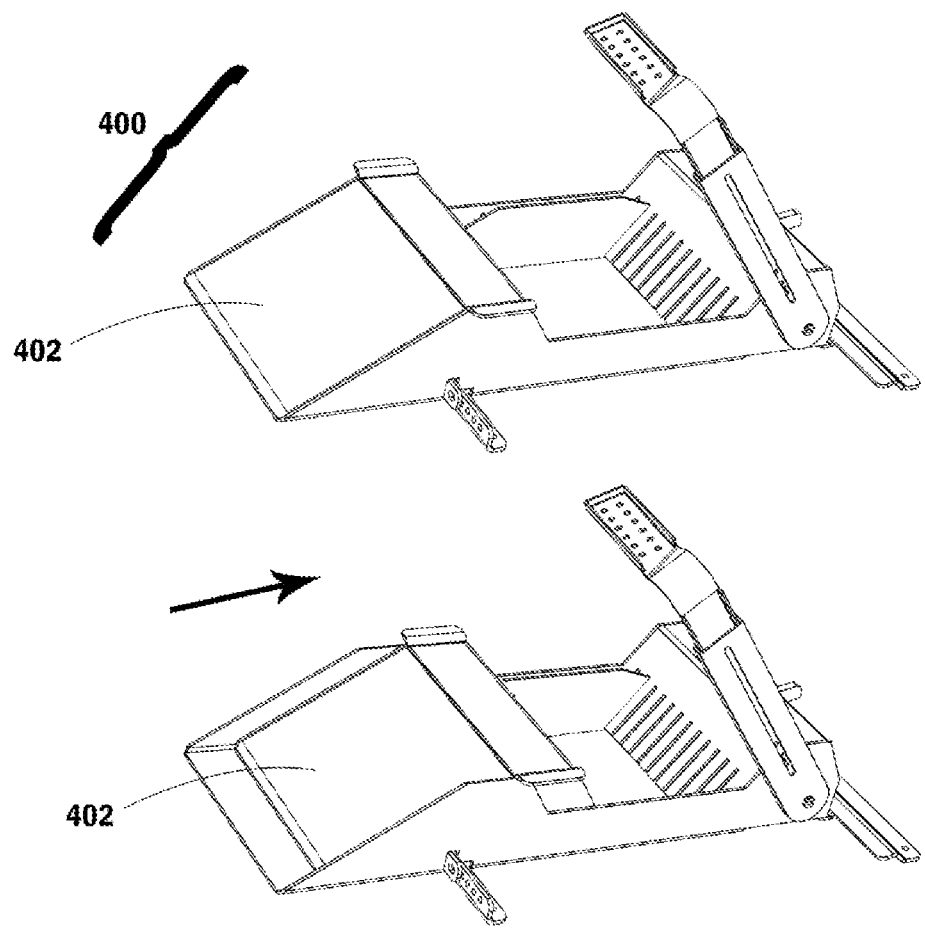
FIG. 11 is an isometric perspective view of a slide block of a trailer-mounted three-way adjustable wheel locking device, as contemplated by the present disclosure.
Figure 12:
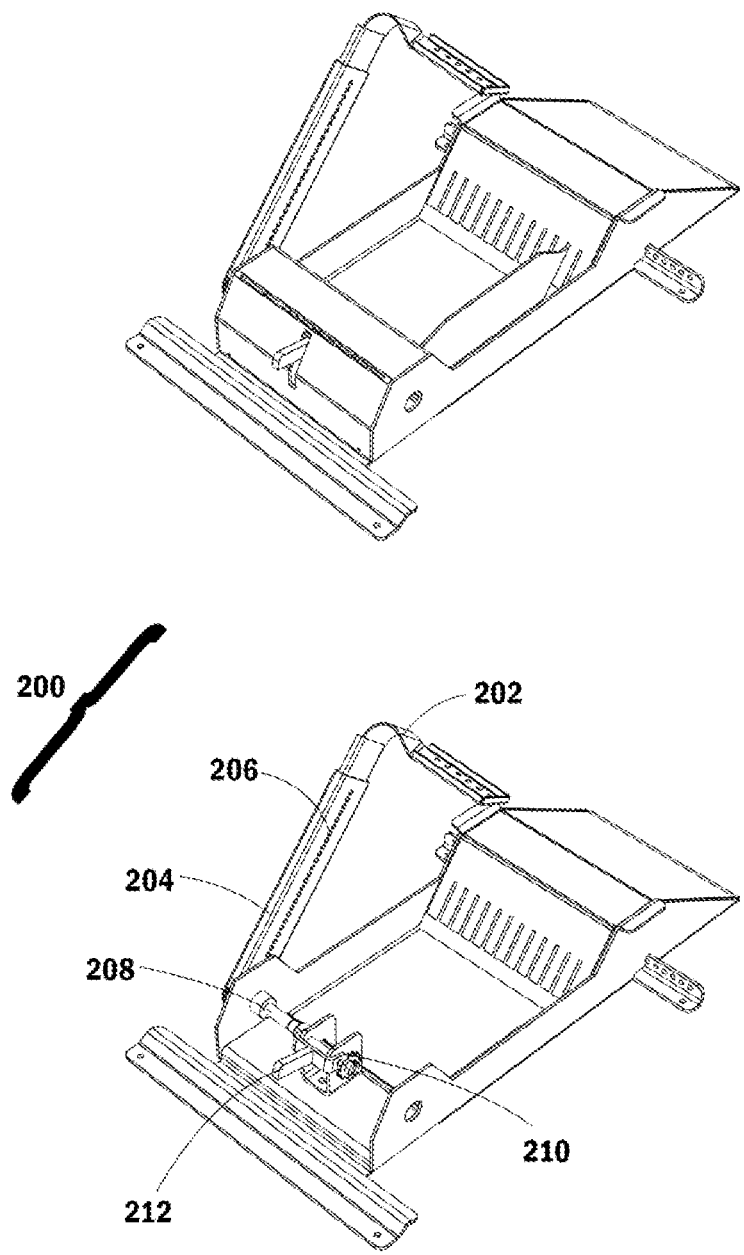
FIG. 12 is an isometric perspective view of a wheel locking mechanism of a trailer-mounted three-way adjustable wheel locking device, as contemplated by the present disclosure.
Figure 13:
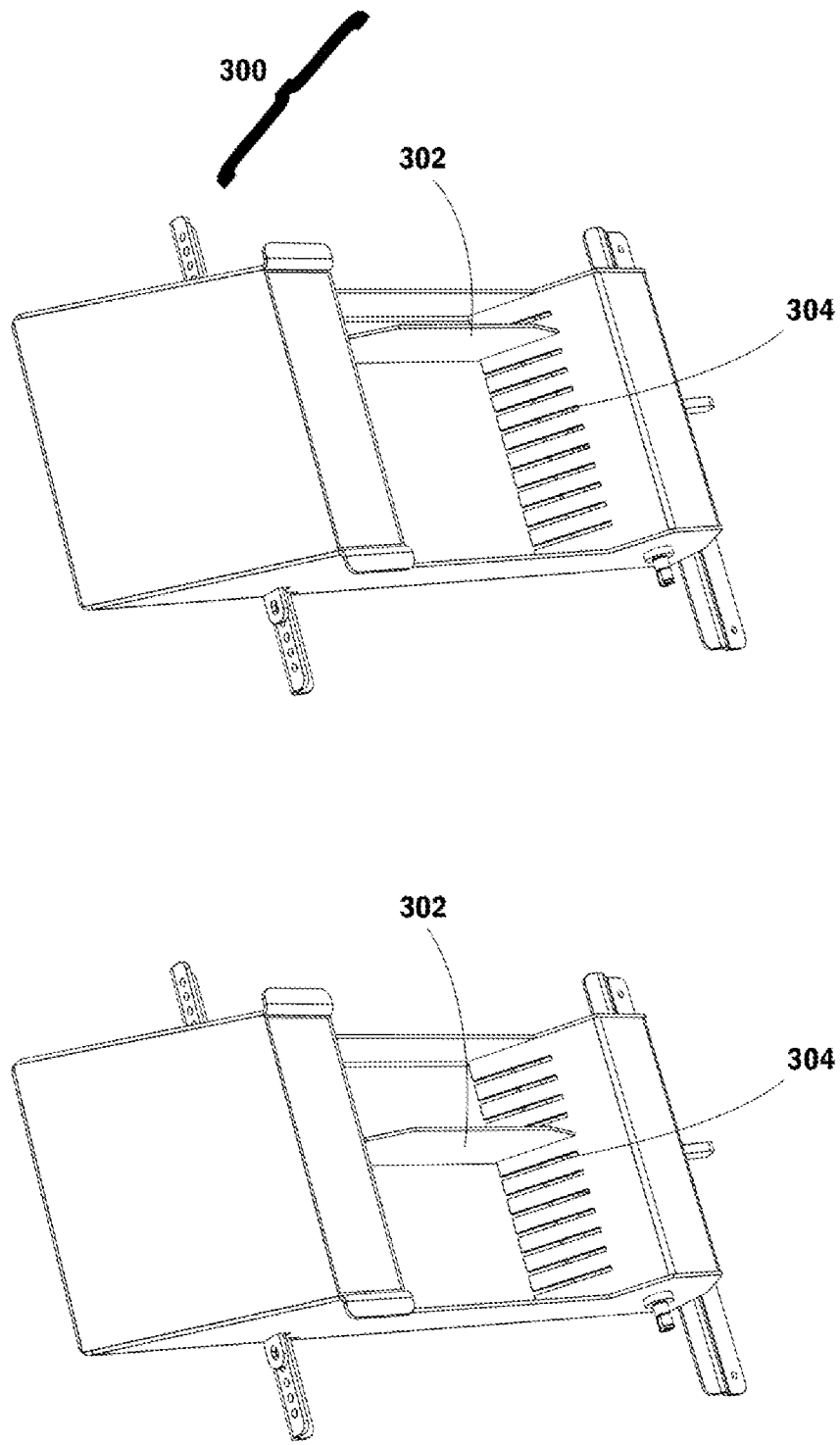
FIG. 13 is an isometric perspective view of a width adjustment mechanism of a trailer-mounted three-way adjustable wheel locking device, as contemplated by the present disclosure.

The illustrations of FIGS. 1-13 illustrate a trailer-mounted three-way adjustable wheel locking device, as contemplated by the present disclosure. The device may comprise, generally, a main body 100, a plurality of mounting brackets, a wheel locking mechanism 200, a width adjustment mechanism 300, and a length adjustment mechanism 400.

The main body 100 may further comprise a front chock 102, a rear chock 104, a base plate 106, a left side 108, and a right side 110. The front chock 102 and rear chock 104 may substantially comprise flattened triangular shapes appropriate for wedging against a wheel and preventing its movement. The front chock 102 may be attached to a front end of the base plate 106 and the rear chock 104 may be attached to a rear end of the base plate 106. In this way a wheel placed between the front chock 102 and the rear chock 104 may be resting on the base plate 106. The left side 108 and right side 110 may comprise vertical retaining walls positioned on either side of the base plate 106 and connecting the front chock 102 and rear chock 104. In this way a wheel placed between the left side 108 and right side 110 may be resting between the two sides on the base plate 106.

The main body 100 may be mounted to a flat surface, such as a trailer deck, by a plurality of mounting brackets into which the main body 100 may be inserted or to which it may be otherwise attached. A front mounting bracket 120 and a rear mounting bracket 124 may be attached to a flat surface, and the front mounting bracket 120 may be designed to receive a front end of the main body 100, while the rear mounting bracket 124 may be designed to receive a rear end of the main body 100. In one embodiment the front mounting bracket 120 may receive a front bracket lip 122, which may be attached to the front chock 102, by sliding the front bracket lip 122 into the front mounting bracket 120. The rear mounting bracket 124 may comprise an L-shape having a plurality of mounting holes, and may be slid into and attached to a rear bracket receiver 126, which may be attached to or built into the rear chock 104. In this way the main body 100 may be reversibly attached to a trailer deck via the front mounting bracket 120 and rear mounting bracket 124.

The wheel locking mechanism 200 may be integrated into the front chock 102 or the rear chock 104, and may substantially comprise a locking swing arm with a height adjustment component. In more detail, the wheel locking mechanism 200 may comprise a wheel retaining bracket 202, which may be an L-shaped bracket, inserted into a distal end of a rotating arm 204. The rotating arm 204 may comprise a height adjustment mechanism 206 that may allow the wheel retaining bracket 202 to be telescoped towards or away from the rotating arm 204. The height adjustment mechanism 206 may further comprise a height lock mechanism that may lock the wheel retaining bracket 202 to the rotating arm 204. The rotating arm 204 be attached at a proximal end to a rotating axle 208, which may allow the rotating arm 204 to articulate through an arc of motion.

The rotating axle 208 may be mounted to the base plate 106, and may further comprise a locking gear 210 that interfaces with a release lever 212. The locking gear 210 may comprise, for example, a circular gear with angulated teeth such that the rotation of the gear by the rotating arm 204 engages a locking tooth on the release lever 212 and prevents its unwanted counter-rotation. The activation of the release lever 212 may allow the gear and, thus, the rotating arm 204 to counter-rotate and release a wheel engaged within the device. The wheel locking mechanism 200 may further comprise a reversible lock that may be engaged to prevent unwanted activation of the release lever 212.

The width adjustment mechanism 300 may comprise a width adjustment plate 302 installed into one of a plurality of width adjustment notches 304. The plurality of width adjustment notches 304 may comprise a plurality of parallel slots within the front chock 102 and rear chock 104, into which the width adjustment plate 302 may be installed so as to reduce the effective width of the opening in the main body 100.

The length adjustment mechanism 400 may comprise a slide block 402 mounted on a plurality of slide rails 404 installed within the rear chock 104. The slide block 402 may slide forwards and backwards along the plurality of slide rails 404 so as to reduce the effective length of the opening in the main body 100.

To begin using the trailer-mounted three-way adjustable wheel locking device a user may first mount the front mounting bracket 120 and rear mounting bracket 124 to a flat surface. The user may then install the main body 100 by inserting the front bracket lip 122 into the front mounting bracket 120 and the rear bracket receiver 126 into the rear mounting bracket 124. The user may then advance a vehicle such that its wheel is placed into the opening created by the front chock 102, rear chock 104, left side 108, and right side 110 and sitting on the base plate 106. The user may then swing the rotating arm 204 of the wheel locking mechanism 200 and adjust the height adjustment mechanism 206 until the wheel retaining bracket 202 is resting against the top of the wheel. The slide block 402 may be retracted or advanced until it is resting against the rear of the wheel, and the width adjustment plate 302 may be adjusted until it is resting against the side of the wheel. In this way the wheel is secured within the device and the vehicle may be secured to the flat surface.

The trailer-mounted three-way adjustable wheel locking device may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the trailer-mounted three-way adjustable wheel locking device may be substantially constructed of one or more materials of steel, aluminum, brass, fiberglass, carbon fiber, silicone, plastic, acrylic, polycarbonate, or combinations thereof. In some embodiments the various components of the device may be coated, lined, or otherwise insulated to prevent contamination of the device.

In one embodiment the trailer-mounted three-way adjustable wheel locking device may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A trailer-mounted three-way adjustable wheel locking device, comprising:
   a main body;
   a wheel locking mechanism;
   a width adjustment mechanism;
   a length adjustment mechanism;
   a front mounting bracket; and
   a rear mounting bracket;
   wherein said main body comprises a front chock, a rear chock, a base plate, a left side, and a right side;
   wherein said front chock is attached to a front end of said base plate;

wherein said rear chock is attached to a rear end of said base plate;

wherein said left side is attached to a left end of said base plate;

wherein said right said is attached to a right end of said base plate;

wherein said front mounting bracket and said rear mounting bracket are installed on a flat surface;

wherein said front chock further comprises a front bracket receiver;

wherein said rear chock further comprises a rear bracket receiver;

wherein said front bracket receiver reversibly engages said front mounting bracket; and wherein said rear bracket receiver reversibly engages said rear mounting bracket.

2. The invention of claim 1, wherein said wheel locking mechanism further comprises a wheel retaining bracket, a rotating arm, a rotating axle, a locking gear, and a release lever;

wherein said wheel retaining bracket is attached to said rotating arm;

wherein said rotating arm is attached to said rotating axle;

wherein said rotating axle is attached to said locking gear; and wherein said locking gear is reversibly attached to said release lever.

3. The invention of claim 2, wherein said rotating arm further comprises a height adjustment mechanism;

wherein said wheel retaining bracket may be reversibly extended away from and retracted towards said rotating arm by said height adjustment mechanism.

4. The invention of claim 3, wherein said width adjustment mechanism further comprises a plurality of width adjustment notches and a width adjustment plate; and wherein said width adjustment plate is reversibly inserted into one of said plurality of width adjustment notches.

5. The invention of claim 4, wherein said length adjustment mechanism further comprises a slide block and a plurality of slide rails; and wherein said slide block reversibly slides along said plurality of slide rails.

* * * * *